United States Patent [19]

Droste et al.

[11] 4,150,911

[45] Apr. 24, 1979

[54] CONTROL DEVICE FOR THE LAYING OF PIPE IN DEEP WATER

[75] Inventors: Werner Droste, Hamburg, Fed. Rep. of Germany; Walter Adler, Den Haag, Netherlands

[73] Assignee: Licentia Patent-Verwaltungs-G.m.b.H, Frankfurt, Fed. Rep. of Germany

[21] Appl. No.: 844,314

[22] Filed: Oct. 21, 1977
(Under 37 CFR 1.47)

[30] Foreign Application Priority Data

Oct. 25, 1976 [DE] Fed. Rep. of Germany ....... 2648264

[51] Int. Cl.$^2$ .................................................. F16L 1/00
[52] U.S. Cl. ....................................... 405/177; 226/25
[58] Field of Search ................. 61/109, 108, 107, 106, 61/110, 111; 226/25, 195

[56] References Cited

U.S. PATENT DOCUMENTS

| | | | |
|---|---|---|---|
| 3,472,034 | 10/1969 | Lawrence | 61/108 |
| 3,668,878 | 6/1972 | Jones et al. | 61/108 |
| 3,715,890 | 2/1973 | Langner | 61/108 |

*Primary Examiner*—Jacob Shapiro
*Attorney, Agent, or Firm*—Spencer & Kaye

[57] ABSTRACT

For laying a pipeline in deep water by letting out the pipeline in predetermined sections from a pipe laying barge which is correspondingly advanced in a stepwise manner, the end of the pipeline being assembled is subjected to an adjustable holding force which is regulated downwardly from an upper to a lower limit value simultaneously with acceleration of the pipe laying barge in the laying direction, the regulating parameter being the displacement of the pipeline relative to the pipe laying barge.

7 Claims, 2 Drawing Figures

CONTROL DEVICE FOR THE LAYING OF PIPE IN DEEP WATER

BACKGROUND OF THE INVENTION

The present invention relates to a control device for controlling the laying of pipe at the bottom of a body of deep water, including a combined pipe displacement and pipe tension control, of the type in which a holding force is exerted on the pipeline by a tensioner and the pipeline is let out in sections of predetermined length, the pipe laying barge being moved in a stepwise manner along the laying path in the laying direction.

The pipe is formed by welding successive pipe sections on the pipe laying barge to the pipe which has already been formed and which must be installed at the bottom of the ocean, or other water body, on a given line, or path. The pipeline is lowered over a rigid stern ramp. A tensioner keeps the pipeline to be lowered under a constant tension so that bending stresses exerted on, and curvatures of, the length of pipe suspended between the barge and the ocean bottom will not exceed predetermined limits. Such a tensioner can be constituted by a clamping device which produces a frictional sliding or rolling engagement between the pipe and pipe layer to permit advancement of the pipe laying barge with constant holding force on the pipe. The principles underlying such an arrangement are described in "Wissenschaftlicher Bericht" [Scientific Report] by AEG-Telefunken 49 (1976), pages 50–59, and Hansa Schiffahrt-Schiffbau-Hafen, Volume 112, 1975, No. 12, pages 983–986.

The driving and holding forces applied to the pipe laying barge are generated, for example, by mooring winches acting via anchors and associated cables, the anchor cables being extendable to about 3500 to 4000 meters.

The pipe laying barge is equipped with a welding line in which the pipe sections are welded to the pipe being laid in several processing stages. When the welding process is completed, the pipe laying barge is moved forward by the length of one pipe section. The clamping conditions at the stern ramp and at the tensioner must be such as to assure that undue deformations of the pipeline are definitely avoided. After having payed out the pipe section by moving forward the pipe laying barge by means of the bow winches, the pipe laying barge is braked to zero by means of the stern winches.

This sequence is repeated after each succeeding pipe section has been welded to the pipe.

In this pipe laying procedure the holding force, or tension, on the pipe is kept constant within narrow preset limits and there is as little movement as possible of the pipe relative to the pipe laying barge as long as the pipe tension remains within these limits. The control characteristic of the tensioner is designed in this case so that the value of the pipe tension, or holding force, is composed of a constant component and a component proportional to the relative speed between the pipe and pipe laying barge.

Considering the procedure in greater detail, during welding of a new pipe section to the previously formed pipeline, the speed of the barge in the forward direction is zero. The barge is held stationary by means of the anchor winches. At the same time the pipeline is kept stationary relative to the barge by causing the tensioner to apply to the pipeline a holding force which remains within preset limits.

If the barge should be subjected to substantial disturbance forces, such as heavy seas or strong winds, the barge will experience displacements which cannot be compensated for quickly enough by action of the anchor cable winches. Therefore, in order to prevent damage to the pipeline under such conditions, pipe must be payed out if the holding force goes above the preset upper limit, or hauled in if the holding force goes below the preset lower limit. Only if the barge movements are small can the pipeline remain stationary relative to the barge.

To satisfy these requirements, the tensioner control device is designed to present a dead zone in its control characteristic. This dead zone is delimited by the above-mentioned preset upper and lower holding force limits in that as long as the holding force remains within these limits, the pipeline is held stationary relative to the barge, while if the holding force goes below or above the dead zone range the pipeline is hauled in or payed out.

As a result of keeping the pipe tension constant within these close, predetermined limits and slowly advancing the pipe laying barge, the speed of the pipe movement relative to the pipe laying barge is also slow and the time required to lay the pipeline is considerable.

SUMMARY OF THE INVENTION

It is therefore an object of the present invention to make possible displacement of the pipe laying barge relative to the pipe through a given length as rapidly and as accurately as possible independently of periodic or accidental disturbing influences.

This and other objects are achieved, according to the present invention, by regulating the tensioner holding force simultaneously with the acceleration of the pipe laying barge in the working direction in such a manner that the tensioner holding force is regulated down from an upper limit value to a lower limit value, the regulating parameter being the displacement of pipe relative to the pipe laying barge.

A significant advantage of the invention is that the pipe laying barge need not be brought to zero speed after paying out a given length of pipe, as was required in the prior art, but it can be moved in the working direction during the following welding phase until the upper limit of holding force value has been reached. This results in significant savings of time and enables the relative displacement of the pipe with respect to the pipe laying barge to be set with great accuracy.

DESCRIPTION OF THE PREFERRED EMBODIMENTS

In the circuit diagram of FIG. 1, the signals appearing on various conductors are defined as follows:

$X_{Rr}$ set = the set value for the pipe length to be payed out relative to the pipe laying barge during each operating cycle.

$\dot{X}_R - \dot{X}_r$ = the actual speed of pipe relative to the pipe laying barge.

$X_R - X_r$ = the actual value of displacement, obtained by integration of $\dot{X}_R - \dot{X}_r$ (speed of pipe relative to the barge). At the beginning of each advancing movement of the barge, this actual value = zero.

$\Delta x$ = the difference between set value $X_{Rr\,set}$ and actual value $X_R-X_r$.

$k_{r\,set}$ = the set value of tensioner holding force. This set value is zero at the beginning of each advancing movement of the barge.

$k_{rl}$ = upper limit for the tensioner holding force.

$k_{r0}$ = lower limit for the tensioner holding force.

$k_{r\,act}$ = actual value of the tensioner holding force.

$\Delta k_r$ = difference between set value and actual value of tensioner holding force ($k_{r\,set} - k_{r\,act}$).

$X_R$ = displacement of pipe laying barge in the laying direction.

$X_r$ = displacement of pipeline end located at barge, in the laying direction.

$k_{B\,set}$ = set value for the pulling forces of the bow winches.

$k_{B\,act}$ = actual value of the pulling forces of the bow winches.

$\Delta k_B$ = difference between set value and actual value of the pulling forces of the bow winches.

$k_{S\,set}$ = set value for the pulling forces of the stern winches.

$k_{S\,act}$ = actual value of the pulling forces of the stern winches.

$\Delta k_S$ = difference between set value and actual value of the pulling forces of the stern winches.

Figure 1:
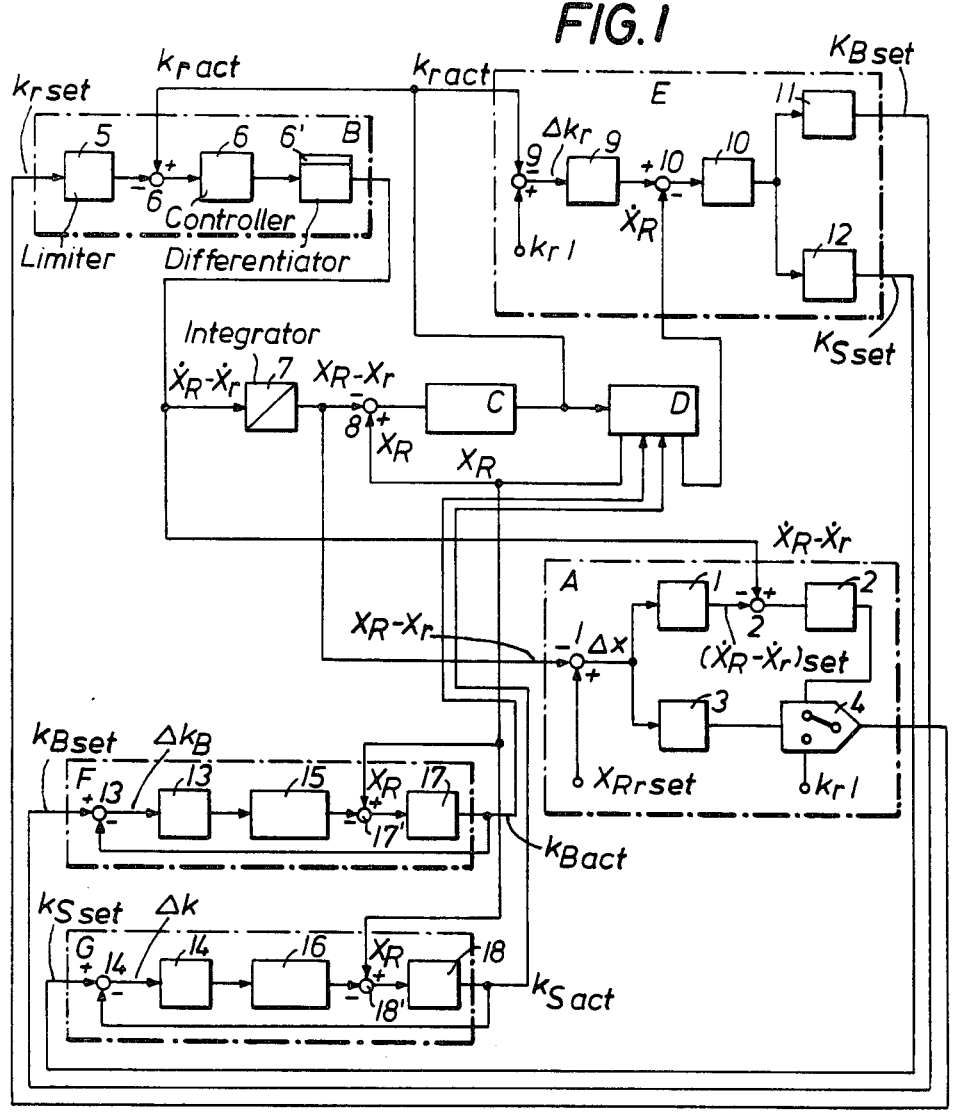
FIG. 1 is a block circuit diagram of a preferred embodiment of a complete control circuit according to the invention.

The circuit of FIG. 1 includes a block A containing a travel path displacement regulator and a tensioner control for the displacement of the pipe relative to the pipe laying barge. Block A includes a controller 1 with an associated summing point receiving the signal $X_{Rr\,set}$ in an adding sense and the signal $X_R-X_r$ in a subtracting sense. The actual relative displacement value signal $X_R-X_r$ is obtained by integration of the relative travel speed signal $\dot{X}_R-\dot{X}_r$ in an integrator 7.

At the beginning of a pipe laying cycle, when the pipe is clamped in the tensioner, $X_R-X_r$ has a value of zero so that the value of the difference signal $\Delta x$ corresponds to $X_{Rr\,set}$. The value for $X_{Rr\,set}$ represents the length of pipe to be payed out from the barge during each operating cycle and depends, of course, on the length of the pipe section welded to the pipe line during each welding cycle. The set value signal $X_{Rr\,set}$ can be provided by connecting a potentiometer to the summing point of controller 1 and suitably adjusting the setting of the potentiometer.

Block A further includes a speed regulator 2 underlying the controller 1 and having an associated summing point containing an adding terminal receiving the signal $\dot{X}_R-\dot{X}_r$ from the input of integrator 7 and a subtracting terminal receiving the signal $(\dot{X}_R - \dot{X}_R)_{set}$, representing the set value for the relative speed, from the output of controller 1. Regulator 2 receives a signal representing the difference between the values of the signals applied to the summing point. At the beginning of a pipe laying cycle, the actual relative speed value is zero, so the input to regulator 2 is equal to the set value of the relative speed value.

When the regulating difference signal $\Delta x$ becomes zero, an electronic switch 4 is actuated by a trigger member 3 to supply at the output of block A a signal $k_{rl}$ representing the upper limit of the dead zone in the tensioner holding force. Signal $k_{rl}$ can be provided by a suitably adjusted potentiometer connected to switch 4.

The actual value signal to speed regulator 2, which determines a maximum limit for paying out speed and underlying the controller 1, is zero at the beginning of an advancing movement of the pipe laying barge, so that the set force value $k_{r\,set}$ is present at the output of switch 4.

Figure 2:
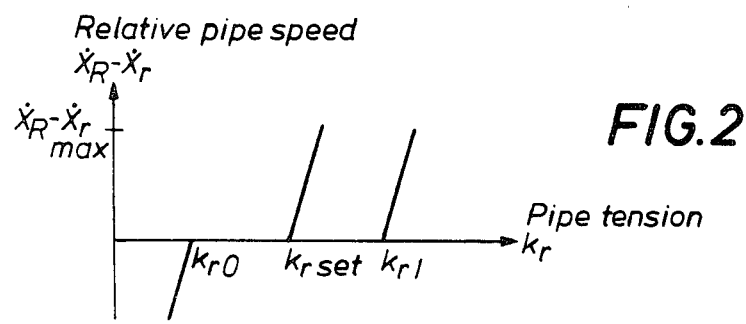
FIG. 2 is a diagram illustrating the operation of the tensioner in accordance with the invention.

This value $k_{r\,set}$ is fed to a comparison member of a controller 6 in a tensioner control block B via a maximum-minimum value limiter 5 so as to assure that, independently of the value given as the set value, the set value will not exceed the upper limit value of the tensioner holding force, $k_{rl}$, and will not drop below the lower limit value $k_{r0}$, as depicted in FIG. 2. The signal representing the actual pipe pulling force value $k_{r\,act}$ is fed via the actual value channel of controller 6 to the comparison member and the difference signal from the comparison member is supplied to the controller proper.

The limit member 5 is adjusted by means of reference voltages, for instance, in such a manner that its output voltage representing the set value $k_{r\,set}$ will not exceed the adjusted upper limit of reference voltage due to $k_{rl}$ and not drop below the lower limit of reference voltage due to $k_{r0}$.

Controller 6 supplies to the pipe tensioner a clamping force control signal which causes the clamping force on the pipeline to vary in a direction from a high actual value of holding force to a lower set value of holding force to reduce the difference between $k_{r\,act}$ and $k_{r\,set}$. Any relative displacement between the pipeline end on the barge and the barge itself is monitored by a suitable movement transducer and the monitoring result is supplied as the output signal from controller 6. This signal is differentiated with respect to time in differentiator 6', resulting in the signal $\dot{X}_R-\dot{X}_r$.

That signal $\dot{X}_R-\dot{X}_r$ is fed to the adding input of the summing point of speed regulator 2 in block A which produces a signal vlaue that acts to limit the pipe laying speed. The relative pipe speed signal $\dot{X}_R-\dot{X}_r$ is also integrated in an integrator 7 to produce the relative displacement signal $X_R-X_r$.

The pipe displacement $X_r$ due to movements of the pipe relative to a reference point fixed in space results in creation of a signal representing the pulling force of the pipe $k_{r\,act}$, derived in block C. Summing point 8 represents the addition of the displacement of the pipe relative to the barge and the actual displacement of the pipe laying barge, while block C is a function generator constructed on the basis of the characteristics of the pipeline to provide an output signal representing the actual value of the holding force being exerted on the pipe.

On the other hand, the relative pipe displacement signal $X_R-X_r$ is fed to controller 1 in block A as an actual value signal. The signal $k_{r\,set}$ is controlled in such a manner that by down regulation below the dead zone of the tensioner the actual pipe holding force drops and pipe is payed out.

If the selected length of pipe for a cycle has been payed out and the control difference signal $\Delta x$ at the input to controller 1 drops to zero, switch 4 is switched by trigger member 3 to emit the value $k_{rl}$ and thus the pipe is held back since the tensioner is then set to the highest value $k_{rl}$ of the dead zone.

Switching of switch 4 to the maximum force value of the dead zone $k_{rl}$ thus makes the relative pipe speed $\dot{X}_R-\dot{X}_r$ zero; consequently only the value $X_R$ is fed as an input value to block C. The pipe displacement $X_r$ at this time in the operating cycle thus corresponds to the pipe laying barge displacement $X_R$, the pipe having been accelerated to the speed of the laying barge.

Since simultaneously with the onset of the paying out of pipe, the laying barge is to be accelerated in the laying direction, the actual value signal of the pipe pulling force $k_{r\,act}$ which decreases as the pipe is payed out, is supplied to the summing point of a controller 9 for controlling the movement of the pipe laying barge in block E, the actual pipe pulling force value being subtracted from the upper limit value $k_{rl}$ at that summing point. The signal $k_{rl}$ which represents, as mentioned above, the highest value of the dead zone of the tensioner force may be derived, for instance, from the same potentiometer as that associated with switch 4.

The output from controller 9 is supplied to a positive input of a summing point of a further controller 10, which summing point also has an inverting input connected to receive a barge speed signal $\dot{X}_R$. The resulting difference signal is processed in controller 10, whose output signal is fed to further members 11 and 12.

Simultaneously with paying out of pipe from the barge, the barge is to be accelerated in the laying direction. A signal representative of the difference between $k_{rl}$ and $k_{r\,act}$ is supplied as a set input to the summing point of controller 10, while a signal representative of actual barge speed is also supplied thereto, i.e. regulation of barge movement underlies regulation of tensioner holding force.

The difference between the signals supplied to the summing point of controller 10 determines the output signal therefrom. A positive difference signal produces, via a function member 11, an output signal $k_{B\,set}$ serving as a setting signal for controlling the bow winches of the pipe layer vessel such that these winches pull in the working direction of the pipe laying barge and the stern winches pay out their anchor cables.

If the difference signal becomes negative, a function member 12 emits a setting signal $k_{S\,set}$ for the stern winches so that the forces acting on those winches are changed to the direction of braking the pipe laying barge to zero.

The function member 11 may be an electronic switch the positive input of which causes a positive output so that in just described manner the bow winches are acted on by their governors in block F. If the output of the governor 10 goes negative, function member 12, which may also be an electronic switch, is actuated. The negative input thereto causes a positive output so that the stern winches are acted on for braking the pipe laying barge to zero by hauling in, under control of block G.

Function blocks F and G contain control circuits for the bow and stern winches, each circuit including a respective controller 13 or 14 having an associated summing point. The summing point of controller 13 receives the setting and actual bow winch signals $k_{B\,set}$ and $k_{B\,act}$ and provides the resulting difference signal $\Delta k_B$. Similarly, the setting and actual stern winch signals $k_{S\,set}$ and $k_{S\,act}$ are supplied to the summing point of controller 14 to provide difference signal $\Delta k_S$. These difference signals of the cable pulling forces serve as the set torque value signals for the winch motors which are applied to the speed and filling signals of the winch drums in the control members 15 and 16 whose outputs are the setting signals for the underlying cable force controllers 17 and 18 so that the effects of difference in fill of the winch drums are prevented.

The pipe laying barge displacement signal $X_R$ is supplied as a disturbing function for the anchor cable force signals since the anchor cables are dependent not only on the winch functions but also on the pipe laying barge movements.

The output signals from the function members 11 and 12 thus serve as set values for the control blocks F and G for the bow and stern winches.

The set values for the cable pulling forces, $k_{B\,set}$ and $k_{S\,set}$, are compared with the actual values of the cable pulling forces $k_{B\,act}$ and $k_{S\,act}$, the differences $\Delta_B$ and $\Delta k_S$ of which are the input values for the control members 15 and 16, whose outputs are the torque set values for the winch motors, serving as setting signal for the underlying cable force regulation. These setting signals are fed to summing points 17' and 18' and thus compared with the barge displacement signal $X_R$ serving as disturbing signal, so that the delivered difference signal is the setting signal for the cable force regulator which acts on the winch motors in the sense of a regulating deiviation. The blocks 17 and 18 thus contain the winch motors with their cable force regulators. The actual values of the cable forces are taken from the cable force regulators of the anchor winches and fed back to the summing points of the torque regulators 13 and 14.

The actual cable force values are supplied together with the actual pipe pulling force value to a function generator D constructed on the basis of the structural and functional characteristics of the barge to generate therefrom the barge displacement and speed signals $X_R$ and $\dot{X}_R$.

In summary, the sequence of an operating cycle is as follows:

During the first movement phase of the pipe laying barge a given set displacement value $X_{Rr\,set}$ determines the set pipe pulling force $k_{r\,set}$ which is supplied to the pipe displacement and tensioner pulling force control so that the actual pipe pulling force value $k_{r\,act}$ decreases and pipe is payed out while simultaneously the pipe laying barge is moved in the laying direction under the effect of the bow winch cable pulling forces.

During the second movement phase, after the given length of pipe has been payed out, switch 4 is switched to the upper limit of the tensioner dead zone $k_{rl}$ so that the pipe is held back. The pipe displacement $X_R-X_r$ relative to the pipe laying barge becomes zero and thus the pipe displacement $X_r$ corresponds to the pipe laying barge displacement $X_R$, i.e., the pipe has been accelerated to the speed of the pipe layer. The pipe laying barge is now moved in the laying direction until the actual pipe pulling force value $k_{r\,act}$ has reached the maximum pipe tension value $k_{r\,max}$. In this case $k_{r\,max}$ may be identical with the upper limit value $k_{rl}$ of the tensioner dead zone.

In the curve of FIG. 2, the distance between the upper limit value $k_{rl}$ and the lower limit value $k_{r0}$ has been selected to be as large as possible without endangering the pipe. This large expanse of the dead zone of the tensioner permits influencing the tensioner within the above-mentioned limit values so as to produce short setting periods and independence from environmental influences. The laying out of pipe is thus regulated by adjustment of the tensioner dead zone.

As can be seen from a consideration of FIG. 2, as the value of $k_{r\,set}$ is reduced while the barge is simultaneously being advanced, the holding force exerted by the tensioner on the pipeline will be reduced in order to pay out pipe so as to reduce the actual pipe tension, $k_{r\,act}$, until it becomes equal to $k_{r\,set}$. If $k_{r\,act}$ should, for any reason, drop below the current value of $k_{r\,set}$, the result would be an increase in the holding force exerted by the tensioner to slow or halt the paying out of the pipe until $k_{r\,set}$ has further decreased or the barge has been moved forward by a certain distance. $(\dot{X}_R-\dot{X}_r)_{max}$ is the maximum limit of paying out speed of the pipe relative to the pipe Laying Barge.

It will be understood that the above description of the present invention is susceptible to various modifications, changes and adaptations, and the same are intended to be comprehended within the meaning and range of equivalents of the appended claims.

What is claimed is:

1. In a system for controlling the laying of a pipeline in deep water, with a combined pipe laying barge displacement and pipe tension control, from a pipe laying barge arranged to advance in a stepwise manner in the pipeline laying direction and to pay out the pipe in successive sections of predetermined length, the system including a tensioner associated with the pipe laying barge for exerting a controllable holding force on the pipeline, the improvemment comprising means operative simultaneously with the acceleration of the pipe laying barge in the laying direction during each stepwise advance for adjusting the tensioner holding force downwardly from an upper limit value to a lower limit value under control of a parameter which is the displacement of the pipeline relative to the pipe laying barge.

2. An arrangement as defined in claim 1 further comprising a pipeline speed control underlying the pipe displacement control for limiting the speed, relative to the barge, of the pipeline section located at the barge to a maximum limit value.

3. An arrangement as defined in claim 1 wherein, after each stepwise advance of the barge, said means for adjusting the holding force causes the holding force to have the upper limit value and temporarily increases the tension on the pipeline to bring the speed of the pipeline section located at the barge relative to the barge to zero thus accelerating the end of the pipeline located at said barge to the speed of said barge.

4. An arrangement as defined in claim 3 wherein said means for adjusting the pulling force operate in dependence on signals representing the displacement of said pipeline relative to the pipe laying barge.

5. An arrangement as defined in claim 3 wherein said means for adjusting the holding force acts to brake the movement of said barge in the pipeline laying direction only when a given maximum pipe pulling force value has been reached, under control of such maximum force acting as a regulating parameter.

6. An arrangement as defined in claim 5 wherein said means comprise a pipe pulling force control unit and a pipe laying barge speed control unit directly underlying said pipe pulling force control unit.

7. An arrangement as defined in claim 5 wherein at the start of a stepwise advance said barge is moved in the laying direction until the actual pipe pulling force has reached the upper limit value.

* * * * *